March 25, 1969 SHINE YASUOKA ET AL 3,435,135

MAGNETIC RECORDING AND REPRODUCING DEVICE FOR TELEVISION SIGNALS USING PULSE MODULATION

Filed Oct. 25, 1965 Sheet 1 of 5

INVENTORS

Shine Yasuoka

Tomio Oyama

BY Stevens, Davis, Miller & Mosher

ATTORNEYS

INVENTORS
Shine Yasuoka
Tomio Oyama
BY Stevens, Davis, Miller & Mosher
ATTORNEYS INVENTORS
Shine Yasuoka
Tomio Oyama
BY Stevens, Davis, Miller & Mosher
ATTORNEYS INVENTORS
Shine Yasuoka
Tomio Oyama
BY Stevens, Davis, Miller & Mosher
ATTORNEYS INVENTORS
Shine Yasuoka
Tomio Oyama
BY Stevens, Davis, Miller & Mosher
ATTORNEYS

United States Patent Office 3,435,135

Patented Mar. 25, 1969

3,435,135

MAGNETIC RECORDING AND REPRODUCING DEVICE FOR TELEVISION SIGNALS USING PULSE MODULATION

Shine Yasuoka and Tomio Oyama, Toyonaka-shi, Japan, assignors to Matsushita Electric Industrial Co., Ltd., Osaka, Japan, a corporation of Japan Filed Oct. 25, 1965, Ser. No. 505,431

Int. Cl. H04n 5/76

U.S. Cl. 178—6.6 6 Claims

ABSTRACT OF THE DISCLOSURE

A device for recording and reproducing composite television signals comprising first and second pulse modulators for modulating the video and sound signals respectively. Each modulator transforms the signal into a pulse train with a sampling time interval proportional to the instantaneous amplitude of the signal to be modulated. Thus the two modulated signals have respective frequency spectra which do not overlap each other. Means are provided for superposing the two modulated signals upon each other and including a common magnetic head for recording the superposed signals on a magnetic tape.

This invention relates to recording and reproducing techniques usable in magnetic recording and reproducing systems for television and other signals.

The present invention proposes to apply pulse modulation to respective television signals including video and sound signals, to combine the pulse-modulated signals by a frequency-division multiplexing method and to record the combined signals on a magnetic tape by means of a common magnetic head.

Conventionally, in the magnetic recording of television signals, video and sound signals have been recorded on a magnetic tape by means of respective exclusive magnetic heads to form different tracks.

In such conventional system, however, it has been necessary to provide at least two magnetic heads employing a magnetic tape appropriate to carry a corresponding number of kinds of record tracks.

According to the present invention, video and sound signals in a mixed form are recorded on a magnetic tape by use of a common magnetic head, making it possible to minimize the number of magnetic heads required while improving tape economics.

The primary object of the present invention is to provide a novel magnetic recording and reproducing device which employs an improved form of magnetic tape and a single magnetic head recording and or reproducing television signals including video and sound signals.

Another object of the present invention is to provide a magnetic recording and reproducing device of the character described which comprises means including a first pulse modulator for modulating the composite video signal, means including a second pulse modulator for modulating the sound signal, said pulse modulators being each designed so as to transform the signal to be modulated into a pulse signal with a sampling time interval proportional to the instantaneous amplitude of the signal to be modulated, the two signals thus modulated having respective frequency spectra so selected as not to overlap each other, and means for superposing the two modulated signals upon each other and including a common magnetic head for recording the superposed signals on a magnetic tape.

A further object of the present invention is to provide a magnetic recording and reproducing device of the character described which comprises means for transforming each of the signals to be modulated into a pulse signal with a sampling time interval proportional to the instantaneous amplitude of the signal to be modulated, band-limiting means for accommodating the respective frequency spectra of the two modulated signals in respective frequency band portions into which a frequency band appropriate for the magnetic recording is divided to be utilized for recording said composite video signal and said sound signal, and means for superposing said two modulated signals upon each other and including a common magnetic head for recording the superposed signals on a magnetic tape.

A further object of the present invention is to provide a magnetic recording and reproducing device of the character described which comprises means including a first modulator for transforming the composite video signal into a rectangular wave with a sampling time interval proportional to the instantaneous amplitude of the signal to be modulated, means for producing a first recording signal comprised of the basic wave and its sideband wave components of said rectangular-wave signal, means including a second modulator for transforming the sound signal into a pulse signal with a sampling time interval proportional to the instantaneous amplitude of the signal to be modulated, means for producing a second recording signal comprised of the basic wave of said pulse signal and higher harmonics and sideband waves thereof in the vicinity of said basic wave, said first and second recording signals having respective frequency spectra selected so as not to overlap each other, and means for superposing said two recording signals upon each other and including a common magnetic head for recording the superposed signals on a magnetic tape.

Yet another object of the present invention is to provide a magnetic recording and reproducing device of the character described which comprises means including a second modulator for frequency modulation of the sound signal, means for producing a first and a second recording signal corresponding to the composite and sound signals, respectively, and having respective frequency spectra selected so as not to overlap each other, and means for superposing said two recording signals and including a common magnetic head for recording the superposed signals on a magnetic tape.

Another object of the present invention is to provide a magnetic recording and reproducing device of the character described which comprises means including a single reproducing head for reproducing the two modulated signals recorded on a magnetic tape, amplifier means including a transistor for amplifying the modulated signals reproduced, means for separating the modulated video signal from one of the output electrodes of said amplifier-transistor while separating the modulated sound signal from another output electrode of said amplifier-transistor, and means for demodulating said two separated, modulated signals after separately amplifying and waveshaping said two signals.

Still another object of the present invention is to provide a magnetic recording and reproducing device of the character described which comprises a first and a second magnetic head for reproducing the two modulated signals recorded on a magnetic tape, said first magnetic head being adapted for reproduction of the modulated video signal and said second magnetic head being positioned along the same recorded track on said magnetic tape as said first magnetic head at a location spaced therefrom for reproduction of the modulated sound signal, and means for demodulating the two reproduced modulated signals after separately amplifying and wave-shaping said two signals.

The foregoing and other objects, features and advantages of the present invention will become apparent from the following detailed description when taken in conjunction with the accompanying drawings, which illustrates a few preferred embodiments of the invention and in which.

Figure 10:
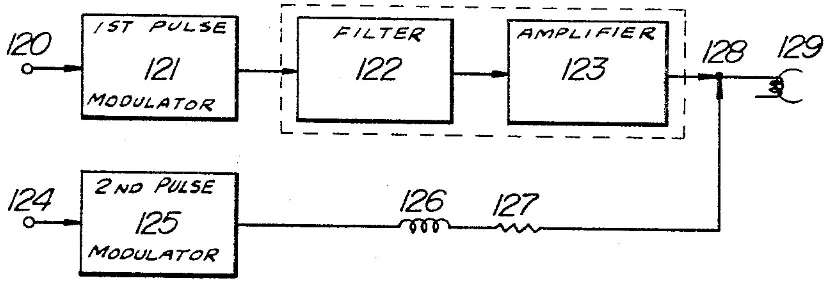
Figure 11:
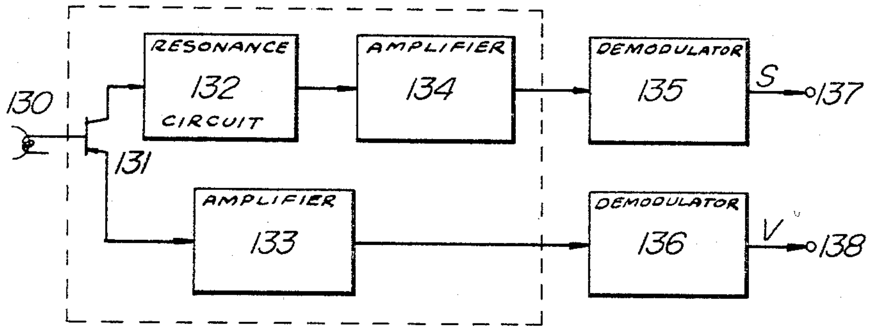
Figure 12:
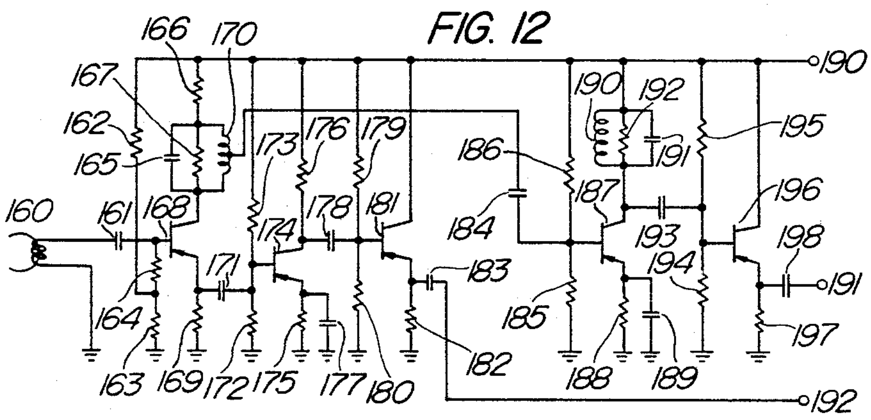
Figure 13:
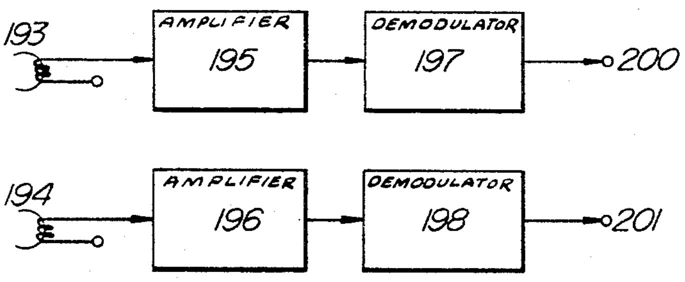
Figure 14:
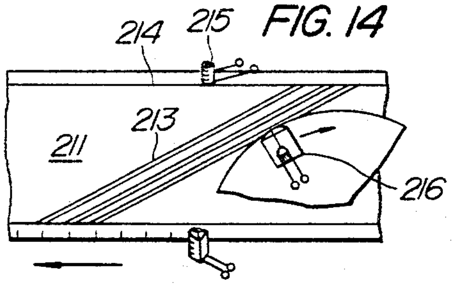
Figure 15:
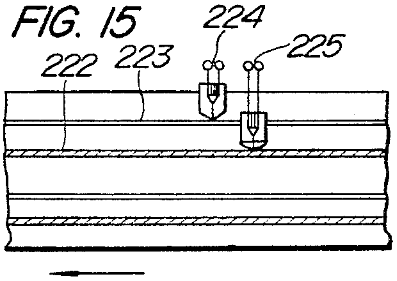

FIG. 10 diagrammatically illustrates the manner in which sound and video signals are combined together in the recording amplifier according to the present invention;

FIG. 11 is a circuit diagram illustrating the separation of sound and video signals in the head amplifier according to the present invention;

FIG. 12 illustrates one example of the circuit arrangement of the head amplifier according to the present invention;

FIG. 13 is a block diagram of the inventive circuit arrangement including two magnetic reproducing heads for separately reproducing video and sound signals;

FIG. 14 is a schematic diagram illustrating a process of recording video and sound signals on a magnetic tape by means of a conventional rotary head type magnetic recording and reproducing device; and FIG. 15 illustrates another recording process being performed on the conventional device.

Heretofore, in the process of recording television or like signals, which range over an extremely wide frequency band, directly on a magnetic sound-recording tape, it has been necessary to employ an extremely high relative speed between the gap of a recording or reproducing head and the travelling magnetic medium so that the higher frequency components of the signal may be properly recorded or reproduced.

On the other hand, the magnetic medium, for example, a magnetic tape is required to run at an ordinary low speed. Under these circumstances, video signals, having higher-frequency components, have been recorded by use of a magnetic head which is rotatable to obtain a high speed relative to the magnetic tape, as illustrated in FIG. 14 at 216, while sound signals, having low frequency components compared to video signals, have been recorded by means of a second magnetic head 215 on a separate track 214 extending edgewise of the magnetic tape 211.

In this process, the magnetic tape runs in the direction indicated by the arrow at a speed of approximately 5 inches per second. The rotary magnetic head 216 with its axis of rotation extending parallel or more or less inclined to the direction of tape travel is rotated at a speed of 1800 or 3600 revolutions per second so that video signals are recorded on the magnetic tape at a relative speed of approximately 15 to 20 meters per second. The frequency band of signals which can at present be processed with such relative movement is generally in the order of 3 mc. to 4 mc. and satisfactory pictures can be reproduced by this process for home, industrial and medical uses.

In this case, sound signals are recorded by means of the magnetic head 215 on the magnetic tape, which is running at a speed of approximately 5 inches per second, as described above. The highest frequency of sound signals which can be properly dealt with is in the order of 15 kc. and can be satisfactorily employed in practice.

Most recently, owing to improvements in performance of the magnetic tape and the magnetic head, it has become possible to record or reproduce video signals even with lower relative speeds between the video recording head (216) and the magnetic tape, for example, of the order of 3 to 5 meters per second. With such relative speeds between the magnetic head and the magnetic tape, video signals of up to approximately 2 mc. can be dealt with the reproduced pictures being barely satisfactory for home television receivers.

In such a case, it has been proved experimentally that television signals including video signals can be properly recessed without use of a rotary magnetic head, such as illustrated in FIG. 14 at 216 by employing a magnetic head of the type used in data-recording tape recorders and operable with a high tape speed of approximately 3 meters per second. However, for tape economics and extended recording, the tape is usually reciprocated to form a number of recorded tracks as shown in FIG. 15. In this case, the video and sound signals are recorded on separate tracks by respective magnetic heads 224 and 225. It has been found that tape economics can be improved nearly twofold by recording both video and sound signals on a single track by means of a common magnetic head.

The present invention provides a novel signal processing technique which includes multiplexing of video and sound signals to enable their simultaneous magnetic recording with a single magnetic head.

Figure 1:
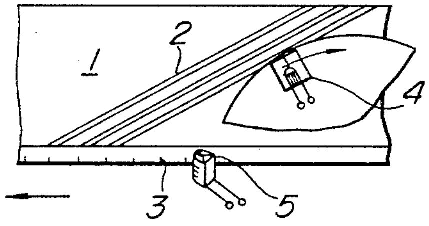
FIG. 1 is a schematic diagram depicting a process of recording video and sound signals on a magnetic tape by a rotary head type magnetic recording and reproducing device embodying the present invention.

The inventive device illustrated in FIG. 1 and the following figures is designed to record television signals including composite video and sound signals simultaneously on a magnetic tape so as to form a common recorded track thereon by use of a single magnetic head.

Referring first to FIG. 10, composite video signals arriving at an input terminal 120 is modulated by a first pulse modulator 121 according to a pulse modulation technique described below and only a required portion of the spectrum of the pulse-modulated signal is drawn out through a filter 122 and then amplified by a recording amplifier 123 to a level enough to drive a magnetic head 129.

On the other hand, a second pulse-modulator 125 is provided for pulse-modulation of sound signals arriving at another input terminal 124. The pulse modulation is effected in a manner described below so that the spectra of the pulse-modulated sound and video signals do not overlap each other. The pulse-modulated sound signal is led through a choke 126–127 to the magnetic head 129 to be combined with the pulse-modulated video signal. The resulting combined form of signal is driven by the magnetic head 129, which corresponds to a combination of magnetic heads 4 and 9 shown in FIGS. 1 and 2, respectively.

Referring next to FIG. 1, a magnetic tape 1 is driven to run in a direction indicated by the arrow at a speed of approximately 5 inches per second. A rotary type magnetic head 4 having an axis of rotation inclined to the direction of tape travel is rotated at 1800 or 3600 revolutions per second to give a relative speed of approximately 15 to 20 meters per second between the head and the magnetic tape. In this manner, a track 2 is recorded on the magnetic tape 1 by the magnetic head 4 to represent a combined video and sound spectrum.

A controlling magnetic head 5 is provided to record control pulses on a control track 3 for the purpose of controlling the tape travel during reproduction to obtain the same relationship between the rotary magnetic head 4 and the recorded track 2 as that which has existed during the signal recording with the rotary head.

Figure 2:
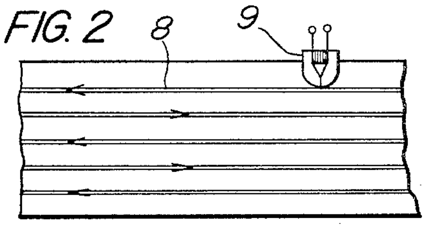
FIG. 2 is a schematic diagram depicting another process of recording video and sound signals on a magnetic tape by the inventive device.

Reference will next be made to FIG. 2 which illustrates another process of signal recording according to the present invention. In this process, a higher tape speed is employed as that used in data-recording type tape recorders, and this owes to recent improvements in performance of the magnetic tape and the magnetic head themselves, which have made it possible to record television signals on a magnetic tape employing a tape speed as high as 3 meters per second. As apparent from FIG. 2, the magnetic tape is reciprocated so that the combined video and sound signal spectrum is recorded successively on tracks 8 by a single magnetic head 9.

It will readily be appreciated that various advantages, including improvement in tape economics and reduction in number of magnetic heads required, can be obtained according to the present invention by simultaneously recording video and sound signals on a common track with a single magnetic head.

Now, description will be made first on the technique of multiplexing video and sound signals and the arrangement therefor, and subsequently on the process of pulse modulation of the signals.

Figures 4, 5, 6:
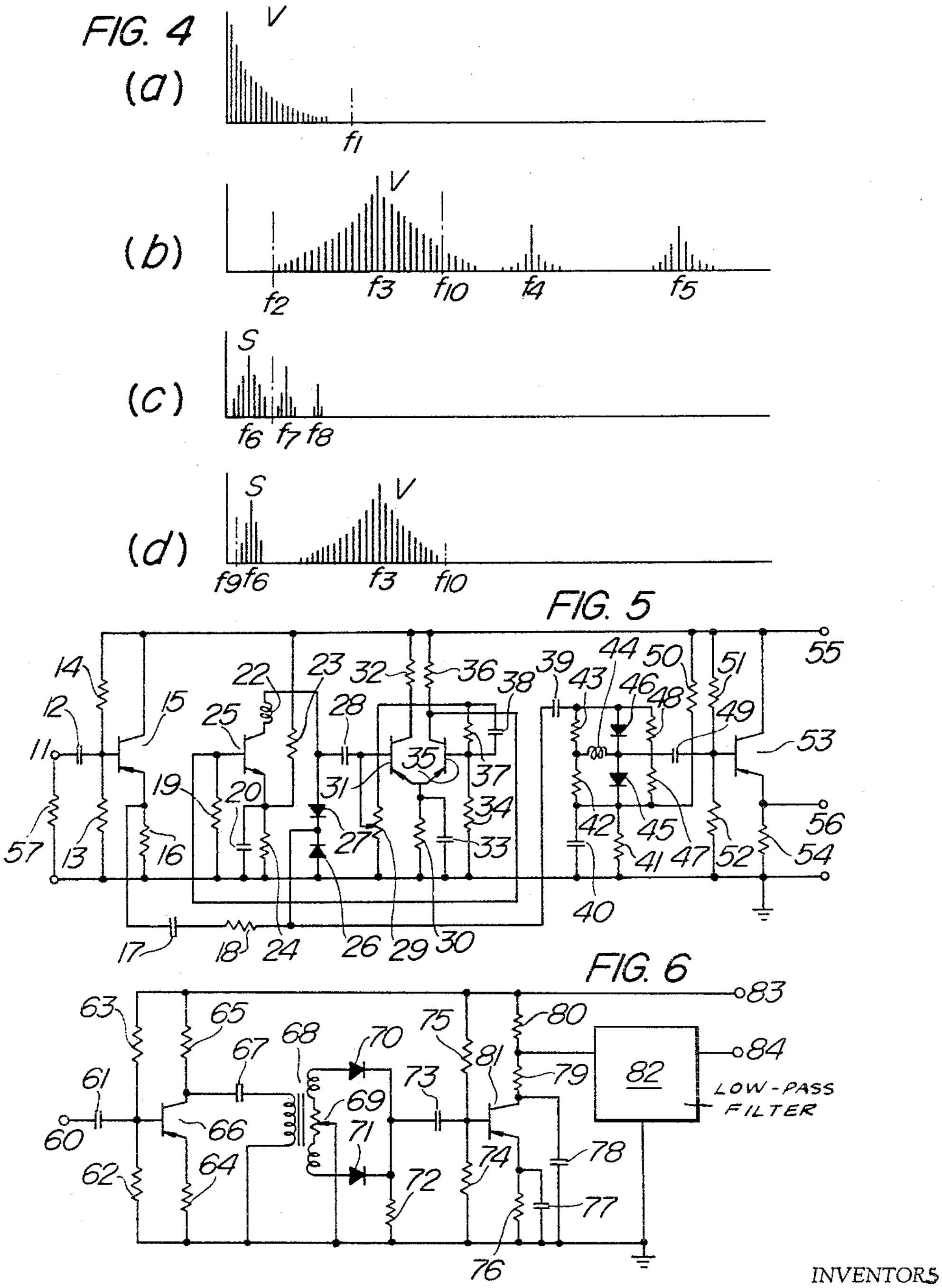
FIG. 4 represents the frequency spectra of video and sound signals pulse-modulated according to the inventive device.
FIG. 5 illustrates a circuit arrangement for pulse modulation of a video signal, embodying the present invention.
FIG. 6 illustrates one example of the pulse demodulation circuit according to the present invention.

Referring to FIG. 10, which illustrates the recording system of the inventive device, a video signal is fed to terminal 120, which has an energy spectral distribution as shown in FIG. 4(*a*) and is pulse-modulated by a pulse modulator 121, which will be described later. FIG. 4(*b*) illustrates the spectral distribution of the pulse-modulated signal.

Assume that the signal to be modulated is transformed into a pulse signal with a mean sampling time of 0.15 $\mu$sec. Then the rectangular wave as obtained by stepping down the signal amplitude to its half value with a flip-flop circuit will have a cycle period of 0.3 $\mu$sec.

The spectral distribution of the pulse waveform includes:

$f_3$=3 mc.
$f_1$=2.5 mc.

as shown in FIG. 4(*b*). That is, the video signal spectrum is distributed centering at $f_3$=3 mc. and also at higher harmonics, $f_4$=6 mc. and $f_5$=9 mc.

The signal having such spectral distribution is passed through a high-pass filter 122 to remove spectral components distributed at $f_2$ and lower frequencies, for example, in the case of a cut-off frequency of $f_2$=500 kc. The wide-band spectrum thus obtained is led through a recording amplifier 123 to drive a magnetic transducer.

The sound signal arriving at terminal 124 is also subjected to pulse modulation at a second pulse modulator 125 operable in the same manner as the first pulse modulator 121. Assuming that the central frequency in this pulse modulation is 200 kc., the sound spectrum has a distribution centering at the basic wave component, $f_6$=200 kc., and the higher harmonic components, $f_7$=400 kc. and $f_8$=600 kc., as shown in FIG. 4(*c*). The components of this spectrum not exceeding $f_2$=500 kc. are taken out and fed to the output 128 of the recording amplifier 123. During this process, it is to be noted that any higher harmonics included in the video pulse signal are prevented from mixing into the sound channel by a choke coil 126 and a resistance 127.

The video and sound spectra are thus superposed upon each other at the output 128 and the resulting spectrum is introduced into the magnetic head 129 to be recorded on a magnetic tape. Incidentally, it has been experimentally ascertained that in this process the energy ratio between the video and sound spectra is approximately 10 to 1 and no substantial interference takes place between the two channels.

Also, experiments show that a practically satisfactory quality can be obtained by this recording process even if frequency modulation is applied to the aural signal in a manner such as to accommodate the signal in the specified band.

The combined video and sound signal recorded on a magnetic tape in the manner described above is reproduced by a reproducing head 130 and the signal thus reproduced has a spectral distribution which is defined by the frequency band of the transmitting system, any components above the upper limit $f_{10}$ (e.g., of 4 mc.) and those below the lower limit $f_9$ (e.g., of 100 kc.) being eliminated, as shown in FIG. 4(*d*).

The energy distribution thus reproduced is processed into the original video and sound signals by a system including amplifier and demodulator devices, as illustrated in FIG. 11.

The reproducing head amplifier device includes a first-stage amplifier 131, which may take the form of a transistor. In this case, a resonance circuit 132, resonant to the frequency $f_6$ and considerably high in Q, is connected to the collector side of the transistor for the purpose of drawing out, the sound spectral components, distributed over a narrow band. The video signal, having a wide-band spectral distribution, is drawn through the emitter side of the transistor 131 by the non-resonance circuit.

On the collector side of the transistor 131 is connected a tuning circuit, high in Q, which serves as a trap for the signal being drawn through the emitter side of the transistor. This is desirable for selective withdrawal of the video component from the composite signal, including the video and sound components.

The video signal thus taken separately from the sound signal is amplified to an appropriate level by another amplifier 133 and passed through a demodulator 136, to appear at its output terminal 138 in the same form as the original video signal.

Such withdrawal of the individual signals through the two different electrodes of the first-stage amplifier 131 is desirable since it simplifies the circuit arrangement as compared to that required for signal separation at a later amplification stage, minimizes the interference possibly occurring between the two channels, and thus facilitates the signal separation.

On the other hand, the sound signal taken out separately from the video signal is further amplified to an appropriate level by a further amplifier 134 and demodulated by a demodulator 135 to appear at its output 137 in the same form as the original sound signal.

The reproducing amplifier circuit described above is illustrated in further detail in FIG. 12.

An alternative reproducing system shown in FIG. 13 employs for reproduction of the sound signal a separate magnetic reproducing head 194, which is simpler in mechanism than the video head. The sound signal is amplified by an amplifier 196 and demodulated by a demodulator 198 to appear at its output terminal 201 in the same form as the original sound signal. In the video channel of this system, the coil of the magnetic head 193 is selected to have an inductance value effective to prevent the sound spectrum on the magnetic tape from being picked up. The video spectrum led through the coil is amplified by an amplifier 195 and demodulated by a demodulator 197 to appear at its output terminal 200 in the same form as the original video signal.

By employing such pulse modulation system, it will be appreciated that multiplexing of video and sound signals can be performed even with a transmission line subject to "jittering" and including a non-linear portion like the one in the recording and reproducing system formed of a magnetic tape and magnetic heads and, in recording both video and sound signals by use of a single magnetic head, the given transmission line can be utilized efficiently with a minimum of interference between the two channels, facilitating the multiplexing of the signals.

Next, the principles of the pulse modulators usable in the present invention will be described in detail. The pulse modulation system is characterized in that it transforms the signal to be modulated into a pulse signal having a sampling time interval proportional to the instantaneous amplitude of the signal to be modulated. It will be apparent from the information theory that this pulse modulation system enables efficient use of the frequency band of any given transmission line for transmission of the pulse signal thus modulated, compared to conventional pulse modulation systems including the pulse-width modulation system, which employs a fixed sampling time, and the pulse position modulation system.

Figure 3:
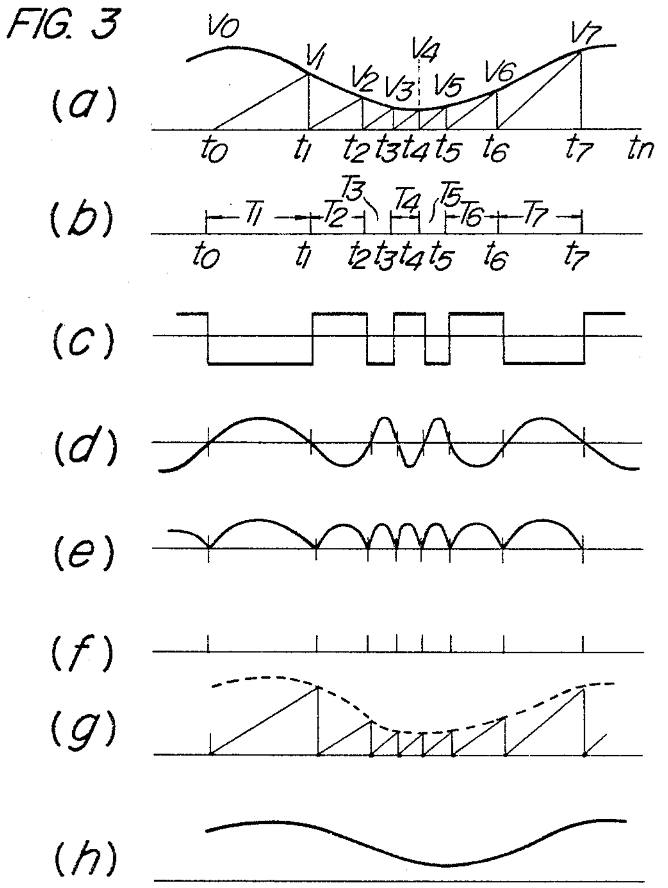
FIG. 3 illustrates signal waveforms appearing in the inventive device at different stages of pulse modulation and demodulation.

According to the above principle, a train of pulses is formed by pulse modulation in the manner as shown in FIG. 3. In this pulse train, the pulse interval is defined by the following formula:

$$T_n - T_{n-1} = kVn \qquad (1)$$

where $T_n$ represents the time of occurrence of the $n$th pulse $T_{n-1}$ represents the time of occurrence of the $(n-1)$th pulse, $Vn$ represents the signal voltage at the time of occurrence of the $n$th pulse, and $k$ represents a constant. Thus, the pulse interval between the $n$th and $(n-1)$th pulses is proportional to the signal amplitude at the time of occurrence of the $(n-1)$th pulse (See FIGS. 3($a$) and 3($b$)).

The pulses thus produced are led to a binary counter circuit (as included, for example, in FIG. 5) to obtain an information-carrying waveform, which is substantially rectangular with the rising and falling edges displaced in time, as illustrated in FIG. 3($c$).

It will be noted that this rectangular waveform is not the one carrying an information in each cycle ($2\pi$) but carries an information modulated in each half cycle ($\pi$).

Where a television signal having a spectral distribution as shown in FIG. 4($a$) is processed in the above manner, the pulse-modulated energy will have a spectral distribution which is centered at the basic frequency component $f_3$ and its higher harmonics in the sampling interval at any instant.

When such pulse signal is recorded by a magnetic recording head and then reproduced, it is subjected to the band-limiting effect of the transmission system, including the magnetic head and the magnetic tape, so that the signal components exceeding the upper frequency limit $f_{10}$ of the transmission system are eliminated, as seen in FIG. 4($d$). In other words, the rectangular waveform, shown in FIG. 3($c$), loses its higher frequency components during its passage through the transmission line, resulting in a waveform with its rising and falling portions tapered, as shown in FIG. 3($d$).

This waveform is passed through a full-wave rectifier (as shown in FIG. 6) to obtain a waveform as shown in FIG. 3($e$), which is differentiated to obtain a pulse train of pulse shown in FIG. 3($f$) as a reproduction of the original pulse train of FIG. 3($b$).

The pulse train of FIG. 3($f$) is led to a saw-tooth wave generator as trigger pulses therefor to obtain a saw-tooth wave signal as shown in FIG. 3($g$). The saw-tooth wave signal is passed through a low-pass filter to obtain its envelope (FIG. 3($h$)) as a reproduction of the original signal, shown in FIG. 3($a$).

FIG. 5 illustrates one example of the modulator side of the pulse modulation system, FIG. 6 illustrating its demodulator side.

The means for producing a pulse signal having a sampling time interval proportional to the instantaneous amplitude of the signal to be modulated may take any suitable form of circuit arrangement. One example illustrated in FIGS. 7, 8 and 9 includes two tunnel diodes and a Schmitt circuit.

Figure 7:
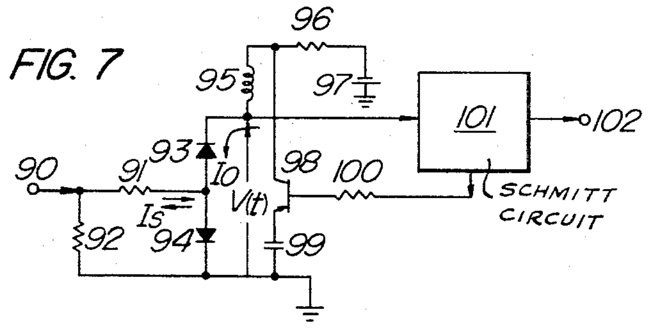
FIG. 7 is a diagram illustrating the principle of pulse modulation according to the present invention.
Figure 8:
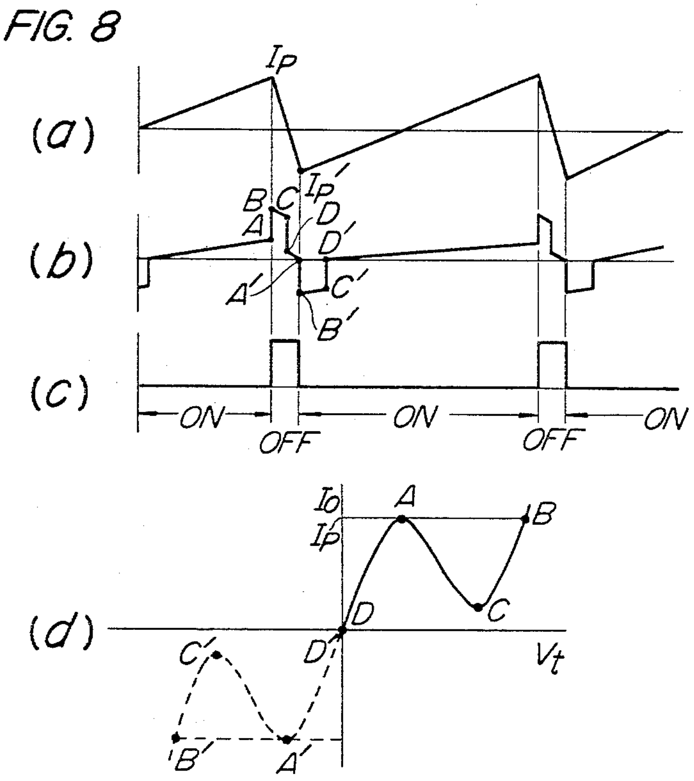
FIG. 8 illustrates a pulse waveform obtained by the pulse modulator shown in FIG. 7.

Referring to FIG. 7, the input signal to be modulated is fed at terminal 90, which is connected by way of an input resistance 92, and, by passing through a series resistance 91, is converted into a current signal $I_s$.

This current is added to or subtracted from the charging current $I_0$ flowing through the coil 95. The charging current $I_0$ is supplied from a voltage source or battery 99, which is series-connected to the coil 95 by way of a switch transistor 98. The transistor is normally conducting and can be regarded as a closed switch. The inductance 95 is connected at the other terminal with tunnel diodes 93 and 94 interconnected in back-to-back relation.

The junction between the coil 95 and the adjacent one of the tunnel diodes 93 is connected to the input of a Schmitt circuit 101, which is a well-known device which receives signals having different voltage levels and sends out as its output a signal having one or the other of the two levels. The output part of this circuit is connected to the input portion of the transistor 98 through the intermediary of a resistance 100. When the switch transistor 98 is in its off state, the current flowing through the coil 95 is passed in reverse direction to the constant current source composed of the resistance 96 and battery 97.

The operation characteristics of the tunnel diodes are well known and illustrated in FIG. 8(d), in which reference characters A,B,C,D and A′,B′,C′ and D′ indicate respective jump points. The upper or solid-line portion of the curve shown in FIG. 8(d) represents the characteristic of one of the tunnel diodes 94 and the lower, dotted line curve portion represents that of the other tunnel diode 93.

The current $I_0$ flowing through the coil 95 is started when the switch transistor 98 becomes conducting with no input signal, i.e., $I_s=0$. Because of the coil 95, the current $I_0$ increases rectilinearly until it reaches point A on the characteristic curve shown in FIG. 8(d) when the current immediately jumps over to point B. The above rectilinear change is illustrated in FIG. 8(a). FIG. 8(b) illustrates the input voltage applied to the Schmitt circuit and FIG. 8(c) represents the output waveform from the Schmitt circuit or the input waveform to the switch transistor. The Schmitt circuit is turned on when the tunnel diode 94 is jumped from point A to point B in FIG. 8(b) and the output waveform thus obtained acts to turn off the switch transistor 98. In this case, the current $I_0$ flowing through the coil 95 is suddenly reversed in direction under the counter bias from battery 97 to reach the inverse peak A′, From this point A the tunnel diode 93 is jumped to point B, so that the Schmitt circuit 101 is triggered off, restoring conducting state of the switch transistor 98.

As such operation is repeated, the signal current $I_s$ is added to or subtracted from the current $I_0$ flowing through the tunnel diodes 93 and 94 to vary the time required for the resultant combined current I to reach the peak A. $I_p$ represents the peak value of the current I. In this manner, it will be understood that the combined current can have a rectilinear relationship with the time required for the instantaneous signal current to cause jumping of the tunnel diode 94. The jumping time enables formation of a pulse signal in such a relation that the output pulses from the Schmitt circuit have a variable interval the increment or decrement of which is proportional to the amplitude of the input signal, as shown in FIG. 8(c).

FIG. 9(a) illustrates an equivalent circuit to the circuit arrangement including thet switch transistor 98 in its "ON" state and FIG. 9(b) an equivalent circuit to the circuit arrangement including the switch transistor in its "OFF" state. In these circuits, assume that the resistance 91 has a value of $R_s$, coil 95 an inductance of L, resistor 96 a resistance of $R_2$, battery 97 a voltage of $E_R$, electric source 110 a voltage of $E_s$, and that the equivalent resistance 111 of the tunnel diode 94 is expressed by $\gamma$ TD94, that 112 of tunnel diode 93 by $\gamma$ TD93, and that $$\tau = \frac{L}{\gamma TD93} \qquad (2)$$

Then the voltage V($t$) appearing across the opposite terminals of the pair of tunnel diodes 93 and 94 is expressed by the formula:

$$V(t)\doteqdot\left[\frac{V_o}{\gamma TD94}\left(1-\epsilon^{-\frac{t}{\tau}}\right)-\frac{V_s}{R_s}\left(1-\epsilon^{-\frac{t}{\tau}}\right)+\frac{V_s}{R_s}\right]\gamma TD94 \quad (3)$$

$$\frac{V_o}{\gamma TD94}\left(1-\epsilon^{-\frac{t}{\tau}}\right)=i_o(t) \quad (4)$$

The first term in the bracket in (3) or $i_o(t)$ represents the basic saw-tooth wave current, forming the mean sampling time with no signal input. The second term in the brackets in (3), that is, the term $$\frac{V_s}{R_s}\left(1-\epsilon^{-\frac{t}{\tau}}\right)=i_s(t) \quad (5)$$

represents the transient component of the signal current. The third term $$\frac{V_3}{R_s}=I_s \quad (6)$$

represents the instantaneous current magnitude of the signal.

In the above analysis, the signal variation is assumed to be long enough compared to the sampling time to allow direct-current approximation.

Examing the Formulae 3, 4, 5 and 6 upon the basis of the Formula 1, which represents the principle of the above pulse modulation, the second term expressing the transient component is negligible as in the actual circuit it has only an effect of the order of 5% upon the sampling time. Thus, the Formula 1 can be reduced to $$T_n \doteqdot k\gamma TD94[i_o+I_s]$$

which indicates the practical feasibility of the pulse modulation principle of the present invention.

Figure 9:
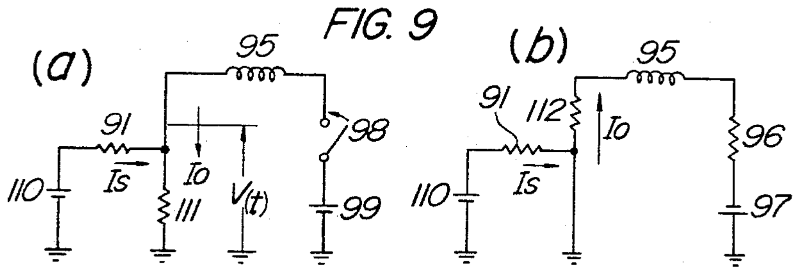
FIG. 9 is an equivalent circuit illustrating the principle of the pulse modulator shown in FIG. 7.

In the equivalent connection of FIG. 9($b$), corresponding to the "OFF" state of the switch transistor, the current $I_o$ flowing through the coil 95 has a very short duration compared to the time $T_n$ as it is readily discharged by the battery 97 and, thus having no substantial influence on the signal current, can also be omitted.

The pulse modulation based upon the above principle can be employed appropriately for modulation of video and sound signals comprising a television signal. FIGS. 5 and 6 illustrate respective specific circuit arrangements for modulation and demodulation of such signals. The circuit arrangements relate video signals but are also applicable to sound signals with use of more or less different constants.

Description will first be made with reference to FIG. 5.

The video signal arriving at the terminal 11 is fed into an emitter-follower by way of an input inpedance terminated at a resistor 57. The video signal thus terminated passes through a capacitor 12 to enter the base of a transistor 15, to which a bias voltage is applied by way of resistors 14 and 13. The collector of this transistor 15 is directly connected to the negative-potential source terminal 55 and the emitter of the transistor is grounded through a resistor 16 and connected to the next modulator by way of a low impedance including a capacitor 17 and resistor 18. When the video signal is thus transmitted to the next modulator, it is transformed into a corresponding signal current by the resistor 18. This signal current is sent to the junction between tunnel diodes 27 and 26 interconnected in back-to-back relation. The other electrode of the tunnel diode 27 is connected through a coil 22 to the collector of a switch transistor 25. The emitter of this transistor is connected with resistors 23 and 24 and a capacitor 20 so that the voltage at the source terminal 55 is divided into appropriate levels and an appropriate bias voltage is applied to enable the transistor 25 to function as a switch. On the other hand, the positive electrode of one of the tunnel diodes 27 is connected by way of a capacitor 28 to a Schmitt circuit including two transistors 31 and 35. Resistors 32, 36, 34, 29 and 30 and a capacitor 33 are provided to define the operation biases for the two transistors. A capacitor 38 and a resistor 37 are employed for feedback purposes. The collector output of the transistor 35 is partly transmitted to the base of the switch transistor 25 for the switching control purpose described above.

Pulses obtained in this manner appear at the middle point between the tunnel diodes 27 and 26 as an output to be led to a flip-flop circuit.

In other words, a train of signal pulses spaced at sampling intervals proportional to the instantaneous amplitude of the signal to be modulated are transmitted through a capacitor 39 to a flip-flop circuit to obtain a rectangular wave signal as shown in FIG. 3($c$). This flip-flop circuit employs two tunnel diodes 45 and 46 in the conventional manner and includes resistors 41, 42, 43, 47, 48 and 50, a capacitor 40 and a coil 44. The output of the circuit is sent through a capacitor 49 into the following emitter follower. This stage employs a well-known connection including a transistor 53. Resistors 51 and 52 are employed to supply an operating bias to the transistor 53 while a resistor 54 forms an output impedance for the transistor 53. The rectangular wave signal obtained with this arrangement is led to the recording amplifier system to be recorded by the magnetic head therein.

For sound signals, a modulation circuit similar to the one described above can be employed but a simpler circuit arrangement can also be utilized.

Different parts of the above-described modulation circuit can be specified as follows:

*Transistors*

| | |
|---|---|
| **15**—2SA70 | **25**—2SC33 |
| **31**—2SA301 | **35**—2SA301 |
| **53**—2SA301 | |

*Tunnel diodes*

| | |
|---|---|
| **26**—1T110 | **27**—1T110 |
| **45**—1T110 | **46**—1T110 |

*Resistors*

| | |
|---|---|
| **13**—6.8KΩ | **14**—18KΩ |
| **16**—560Ω | **18**—500Ω |
| **19**—5.6KΩ | **23**—470Ω |
| **24**—330Ω | **29**—50KΩ |
| **30**—220Ω | **32**—1KΩ |
| **34**—750Ω | **36**—1KΩ |
| **37**—1.2KΩ | **41**—330Ω |
| **42**—470Ω | **43**—470Ω |
| **47**—100Ω | **48**—100Ω |
| **50**—1.8KΩ | **51**—82KΩ |
| **52**—10KΩ | **54**—150Ω |
| **57**—75Ω | |

*Capacitors*

| | |
|---|---|
| **12**—30 μf. | **17**—100 μf. |
| **20**—10 μf. | **28**—220 pf. |
| **33**—1000 pf. | **38**—580 pf. |
| **39**—100 pf. | **40**—0.1 μf. |
| **49**—1000 pf. | |

*Coils*

| | |
|---|---|
| **22**—10 μh. | **44**—70 μh. |

FIG. 6 represents a circuit diagram of the demodulation circuit for pulse-modulated video signals as described hereinbefore.

The signal output of the reproducing head as amplified to an appropriate level is shown in FIG. 3($d$). The signal is led through a capacitor 61 to the base of an amplifier transistor 66. Resistors 62, 63 and 64 are employed to apply a bias voltage to the transistor 66 for proper operation thereof. The amplified output voltage is drawn from the collector of the transistor through a load in the form of a resistor 65 and fed through a capacitor 67 into a phase-dividing transformer 68. The secondary winding of the transformer 68 has two outputs having a phase difference of 180°. The outputs of the transformer 68 are led to respective diodes 70 and 71 where the negative side of the outputs are clipped off. The clipped signal components thus obtained are combined together to appear across the opposite terminals of a load resistance 72 as a fullwave-rectified waveform, as shown in FIG. 3(*e*). A variable resistor 69 is employed to obtain an equilibrium between the two voltages.

The signal of FIG. 3(*e*) thus taken out is converted by a differentiating circuit including a capacitor 73 and a resistor 74 into a pulse train as shown in FIG. 3(*f*), appearing at the base of a transistor 81. This transistor 81 is a saw-tooth wave generator and includes resistors 79 and 80 and a capacitor 78 all connected to its collector. The above pulse train serves the triggering purpose on the base side of the transistor to obtain on its collector side a sawtooth wave as illustrated in FIG. 3(*g*). Resistors 74, 75 and 76 and a capacitor 77 are arranged as shown to supply an operating bias to the transistor 81.

The saw-tooth wave obtained in this manner is passed through a low-pass filter 82 to obtain the envelope of the saw-tooth wave at the output terminal 84 of the filter, as shown in FIG. 3(*h*).

The envelope is a wave of the same form as the original signal. The terminal 83 in FIG. 6 is connected to the negative voltage source.

Different parts of the circuit of FIG. 6 can be specified as follows:

*Transistors*

| | |
|---|---|
| 66—2SA70 | 81—2SA413 |

*Diodes*

| | |
|---|---|
| 70—0A73 | 71—0A73 |

*Resistors*

| | |
|---|---|
| 62—1KΩ | 63—15KΩ |
| 64—82Ω | 65—1KΩ |
| 69—100Ω | 72—1KΩ |
| 74—2.2KΩ | 75—47KΩ |
| 76—150Ω | 79—3.3KΩ |
| 80—1KΩ | |

*Capacitors*

| | |
|---|---|
| 61—0.1 μf. | 67—0.1 μf. |
| 73—50 μf. | 77—30 μf. |
| 78—150 pf. | |

Reference will next be made to FIG. 12, which illustrates the circuit arrangement of the reproducing-head amplifier mentioned hereinbefore.

The reproduction output of the magnetic head 160 is led through a capacitor 161 to the base of a first-stage amplifier transistor 168. A coil 170 and a capacitor 165 are connected on the collector side of the transistor 168 for tuning with the basic frequency component ($f_6$=200 kc.) of the modulated sound pulse signal so that the sound pulse signal can be picked up from the collector side. On the other hand, the video spectrum is picked up from the emitter side of the transistor 168 and fed through a capacitor 171 into the next following amplifier stage.

Resistors 162, 163, 164 and 166 are arranged in connection with the transistor 168 for the purpose of supplying an appropriate bias thereto. Reference numerals 167 and 169 indicate a damping resistance and a load, respectively.

The video spectrum picked up is amplified by an amplifier 174 to a required level, then led through a capacitor 178 to the next-stage emitter-follower 181 and fed from its emitter side into a demodulator through a limited impedance. Incidentally, resistors 176 and 182 are provided for loading purposes and those indicated by 172, 173, 176, 179 and 180 serve the biasing purpose.

The sound signal picked up is led through a capacitor 184 to an amplifier 187 to be amplified to an appropriate level by employing a load in the form of a tuning circuit including a coil 190 and a capacitor 191. The amplified signal is fed through a capacitor 193 and an emitter-follower 196 into a demodulator. Biasing resistors 185, 186, 188, 194 and 195, a damping resistor 192 and a load resistor 197 are arranged as illustrated.

Different parts of the circuit of FIG. 12 can be specified as follows:

*Transistors*

| | |
|---|---|
| 168—2SA309 | 174—2SA309 |
| 181—2SA309 | 187—2SA341 |
| 196—2SA341 | |

*Resistors*

| | |
|---|---|
| 162—100KΩ | 163—5.6KΩ |
| 164—39KΩ | 166—3.3KΩ |
| 167—3.3KΩ | 169—1KΩ |
| 172—12KΩ | 173—120KΩ |
| 175—1KΩ | 176—3.3KΩ |
| 179—6.8KΩ | 180—56KΩ |
| 182—220Ω | 185—4.7KΩ |
| 186—43KΩ | 188—1KΩ |
| 192—3.3KΩ | 194—8.2KΩ |
| 195—56KΩ | 197—560Ω |

*Capacitors*

| | |
|---|---|
| 161—0.05 μf. | 165—680 pf. |
| 171—0.05 μf. | 177—0.1 μf. |
| 178—0.05 μf. | 183—0.05 μf. |
| 184—0.05 μf. | 189—0.1 μf. |
| 191—680 pf. | 193—0.05 μf. |
| 198—0.5 μf. | |

*Coils*

| | |
|---|---|
| 170—1 μh. | 190—1 μh. |

While a particular embodiment of the present invention has been shown and described, it is apparent that changes and modifications may be made without departing from the spirit and scope of the invention as defined in the appended claims.

What is claimed is:

1. In a magnetic recording and reproducing device for recording and/or reproducing television signals including a composite video signal and a sound signal, means including a first pulse modulator for modulating said composite video signal, means including a second pulse modulator for modulating said sound signal, said first and second pulse modulators being each designed so as to transform the signal to be modulated into a pulse signal having a sampling time interval proportional to the instantaneous amplitude of the signal to be modulated, the two signals thus modulated having respective frequency spectra so selected as not to overlap each other, and means for superposing the two modulated signals upon each other and recording the signals thus superposed on a magnetic tape by means of a common magnetic head.

2. In a magnetic recording and reproducing device for recording and/or reproducing television signals including a composite video signal and a sound signal, means including a first pulse modulator for modulating said composite video signal, means including a second pulse modulator for modulating said sound signal, said first and second pulse modulators being each designed so as to transform the signal to be modulated into a pulse signal having a sampling time interval proportional to the instantaneous amplitude of the signal to be modulated, band-limiting means for enabling the frequency spectra of the two respective modulated signals to be accommodated in two respective frequency band portions into which a frequency band appropriate for the magnetic recording is divided to be utilized for the recording of said composite video signal and said sound signal, and means for superposing said two modulated signals limited in bandwidth upon each other and recording the signals thus superposed on a magnetic tape by means of a common magnetic head.

3. In a magnetic recording and reproducing device for recording and/or reproducing television signals including a composite video signal and a sound signal, means including a first modulator for modulating said composite video signal, said first modulator being designed so as to transform the signal to be modulated into a rectangular wave having a sampling time interval proportional to the instantaneous amplitude of the signal to be modulated, means for producing a first recording signal comprised of the basic wave and its sideband wave components, means including a second modulator for modulating said sound signal, said second modulator being designed so as to transform the signal to be modulated into a pulse signal having a sampling time interval proportional to the instantaneous amplitude of the signal to be modulated, means for producing a second recording signal comprised of the basic wave of said pulse signal and higher harmonics and sideband waves thereof in the vicinity of said basic wave, said first and second recording signals having respective frequency spectra selected so as not to overlap each other, and means for superposing said two record signals upon each other and recording the signals thus superposed on a magnetic tape by a common magnetic head.

4. In a magnetic recording and reproducing device for recording and/or reproducing television signals including a composite video signal and a sound signal, means including a first modulator for modulating said composite video signal, said first modulator being designed to transform the signal to be modulated into a rectangular wave having a sampling time interval proportional to the instantaneous amplitude of the signal to be modulated, means for producing a first recording signal comprised of the basic wave and its sideband wave components of said rectangular wave signal, means including a second modulator for frequency modulation of said sound signal to obtain a second recording signal, said first and second recording signals having respective frequency spectra selected so as not to overlap each other, and means for superposing said two recording signals upon each other and recording the signals thus superposed on a magnetic tape by a common magnetic head.

5. In a magnetic recording and reproducing device for recording and/or reproducing television signals including a composite video signal and a sound signal, means including a first pulse modulator for modulating said composite video signal, means including a second pulse modulator for modulating said sound signal, said first and second pulse modulators being each designed so as to transform the signal to be modulated into a pulse signal with a sampling time interval proportional to the instantaneous amplitude of the signal to be modulated, said two signals modulated having respective frequency spectra selected so as not to overlap each other, means for superposing said two modulated signals upon each other and including a common magnetic head for recording the superposed signals upon a magnetic tape, means including a reproducing head for reproducing said two modulated signals recorded on the magnetic tape, amplifier means including a transistor for amplifying the modulated signals reproduced, means for separating the modulated video signal from one of the output electrodes of said amplifier-transistor while separating the modulated sound signal from another output electrode of said amplifier-transistor, and means for demodulating said two separated, modulated signals after they have been separately subjected to amplification and wave-shaping.

6. In a magnetic recording and reproducing device, for recording and/or reproducing television signals including a composite video signal and a sound signal, means including a first pulse modulator for modulating said composite video signal, means including a second pulse modulator for modulating said sound signal, said first and second pulse modulators being designed so as to transform the signal to be modulated into a pulse signal with a sampling time interval proportional to the instantaneous amplitude of the signal to be modulated, said two signals modulated having respective frequency spectra selected so as not to overlap each other, means for superposing said two modulated signals upon each other and including a common magnetic head for recording the superposed signals on a magnetic tape, first and second magnetic heads for reproducing said two modulated signals recorded on the magnetic tape, said first magnetic head being adapted for reproduction of said modulated video signal, said second magnetic head being positioned along the same recorded track on said magnetic tape as said first magnetic head at a location spaced therefrom for reproduction of said modulated sound signal, and means for demodulating said two reproduced modulated signals after separately amplifying and wave-shaping said two signals.

References Cited

UNITED STATES PATENTS 3,137,768 6/1964 Mullin.

ROBERT L. GRIFFIN, *Primary Examiner.*

HOWARD W. BRITTON, *Assistant Examiner.*

U.S. Cl. X.R.

178—5.6; 179—100.2